UNITED STATES PATENT OFFICE.

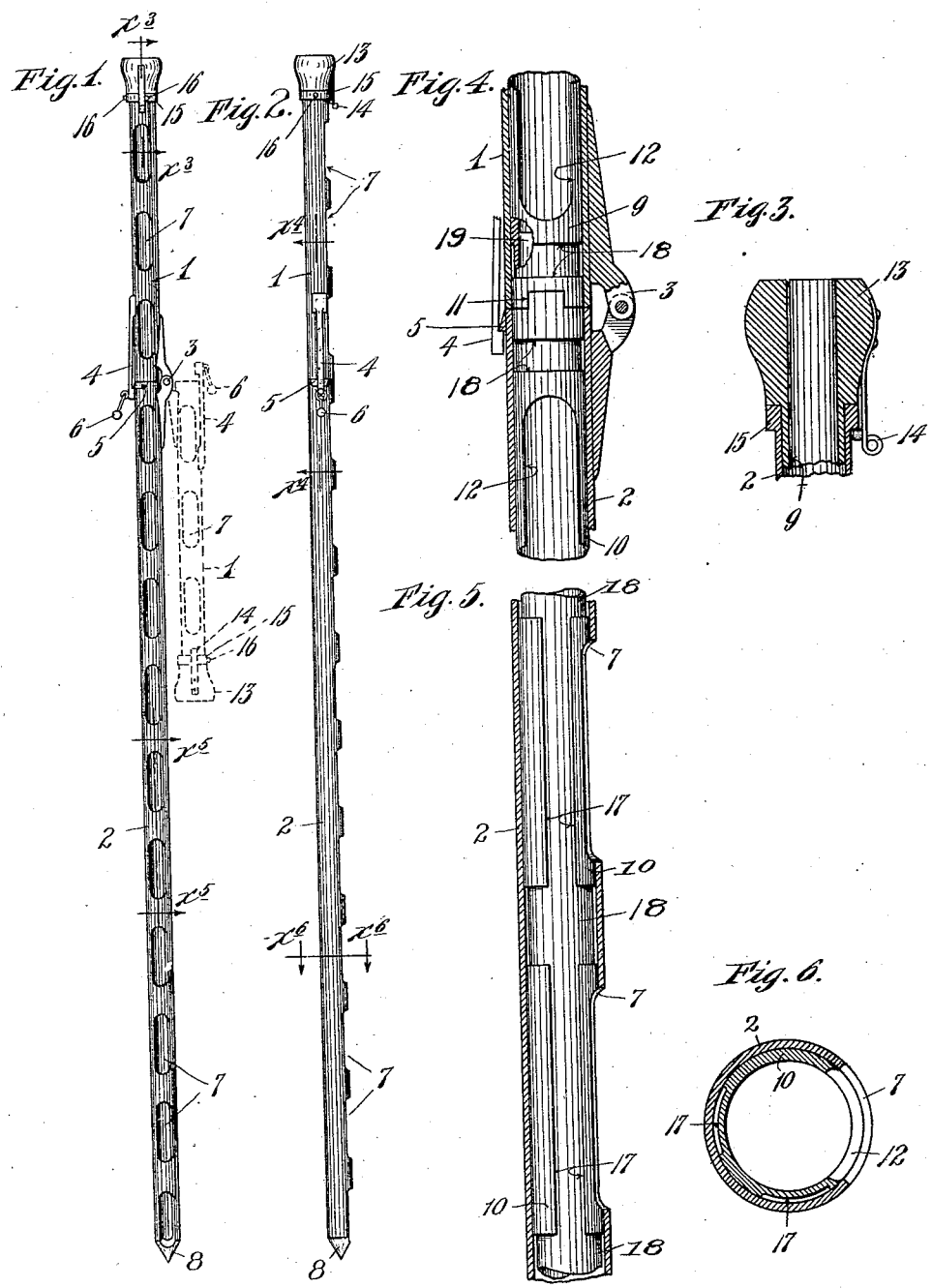

HUBERT M. GRAY, OF MINNEAPOLIS, MINNESOTA.

GRAIN-SAMPLER.

No. 855,849.  Specification of Letters Patent.  Patented June 4, 1907.

Application filed February 23, 1906. Serial No. 302,407.

*To all whom it may concern:*

Be it known that I, HUBERT M. GRAY, a citizen of the United States, residing at Minneapolis, in the county of Hennepin and State of Minnesota, have invented certain new and useful Improvements in Grain-Samplers; and I do hereby declare the following to be a full, clear, and exact description of the invention, such as will enable others skilled in the art to which it appertains to make and use the same.

My invention relates to grain samplers for use in taking samples of grain from cars, and has for its especial object to improve the same, in the several particulars hereinafter noted.

The invention consists of the novel devices and combinations of devices hereinafter described and defined in the claims.

In large or heavily loaded cars, it is difficult to secure a sample of grain from the bottom of the cars. The distance between the top of the load and the top of the car will not permit the use of a rigid or integrally formed sampler long enough to reach through the body of grain. Some shippers of grain, being aware of this fact, fill in on the bottom of the car anywhere from one to two feet of grain of an inferior quality. This being the case, it is very desirable that the party receiving the car be able to secure samples of grain lying near the bottom of the car. It is also almost impossible to secure samples of flax seed with the samplers now in use, inasmuch as flax seed will work in between the outer and inner tubes of the sampler thereby causing them to bind, so that it becomes difficult to rotate the tubes with respect to each other. The only way to remove the flax seed lodged between said tubes is to separate the inner tube from the outer one, and then scrape the tubes. This of course, causes much delay and annoyance.

One feature of my invention consists of making a grain sampler in sections, so that the first section may be first forced down into the load of grain, and then by securing a second section to the first section, the complete sampler may then be forced down through the grain until its lower end touches the bottom of the car.

Another feature consists in grooving the tubes or sections of the sampler, so that they will become self-cleaning, discharging flax seed or any dirt that may work in between the tubes or sections.

The invention is illustrated in the accompanying drawings, wherein like characters indicate like parts throughout the several views.

Figure 1 is a front elevation showing the improved grain sampler, with some parts in dotted position. Fig. 2 is a side elevation showing the improved grain sampler. Fig. 3 is a vertical section on an enlarged scale, taken through a portion of the sampler on the line $x^3x^3$ of Fig. 1. Fig. 4 is a vertical section on an enlarged scale, taken through a portion of the outer tube of the sampler on the line $x^4x^4$ Fig. 2, and showing a portion of the inner tube in full. Fig. 5 is a vertical section on an enlarged scale, taken through a portion of the outer tube of the sampler on the line $x^5x^5$ of Fig. 1, and showing a portion of the inner tube in full; and, Fig. 6 is a horizontal section on an enlarged scale taken on the line $x^6x^6$ of Fig. 2.

In the drawings the numeral 1 indicates the upper section, and the numeral 2, the lower section of the outer tube of the improved sampler. Said sections being secured together by a hinge 3, for swinging movements, as shown by dotted line in Fig. 1. A spring finger 4 secured near the bottom of the upper section 1 has locking engagement with a lug 5 secured to top of the lower section 2. A finger piece 6 is pivoted to the lower end of the spring finger 4, to enable the operator to withdraw the said spring finger out of engagement with the lug 5. Each of the sections 1 and 2 are provided with ports, or openings 7 through which the grain may flow. The lower end of the section 2 terminates in a sharp or conical shaped point 8.

A sectional inner tube is mounted within the sections 1 and 2 of the outer tube; the numeral 9 indicates the upper section, and the numeral 10 the lower section of said inner tube. An interlocking clutch joint 11 formed in the abutting ends of said sections 9 and 10, lock said sections together for common rotation within the sections 1 and 2 of the said outer tube. The sections 9 and 10 of the inner tube are also provided with ports or openings 12, which are adapted to be moved into and out of registration with the corresponding ports or openings of the outer tube.

The upper end of section 9 of the inner tube terminates in a hand piece 13. The operator by taking hold of said hand piece 13 with one hand, and with the other hand take hold of section 1, may rotate the tubes with respect to each other. A spring latch 14 secured to the hand piece 13 has locking engagement with a flange 15 formed at the upper end of section 1 of the outer tube to prevent the sections of the outer and inner tube from moving end wise with respect to each other, while said sections are being rotated, and also to prevent section 9 from dropping out of section 1, when the same is turned into the position indicated by dotted lines in Fig. 1.

A pair of stop pins 16 projecting from the flange 15 of section 1 are located on either side of the spring latch 14, to limit the rotation of the tubes with respect to each other, and to enable the operator to tell when the ports 7 and 12 are in or out of registration one with the other, when the sections are submerged in the grain.

The sections 9 and 10 of the inner tube are formed with grooves 17 preferably (as shown) two in number running from the top to the bottom of said sections. Any number of grooves, however, may be used. As shown, wide grooves 18 run completely around the sections 9 and 10 and are located between the ports or openings 12 of said sections, connecting the grooves 17 one with the other.

The operation of the improved sampler may be briefly stated as follows; the outer and inner tubes are first rotated with respect to each other, so that the ports 7 and 12 are out of registration one with the other. Then by lifting the spring finger 4 out of engagement with lug 5, section 1 of the outer tube may be swung on the hinge 3 into a position indicated by dotted lines in Fig. 1. By this movement sections 9 and 10 of the inner tube will be separated at the clutch joint 11, and the section 9 will be carried with section 1. The sampler is now of such length that it may be inserted between the top of the load and the top of the car. The sampler is then forced down into the grain almost the entire length of section 1. This will give sufficient head room, so that section 1 may be turned up into the position indicated by full lines shown in Figs. 1 and 2 of the drawings. The sampler may now be forced the balance of the way through the grain until the lower end of section 1 strikes the bottom of the car. Then the inner and outer tubes are rotated to open up the ports 7 and 12. The grain will then flow through the said ports and fill the sampler. After sufficient time has been allowed for the sampler to be completely filled with grain, the inner and outer tubes are again rotated with respect to each other, and the ports 7 and 12 moved out of registration one with the other. The sampler may now be partly withdrawn from the grain, first by lifting the sampler about half way out of the grain, this will give sufficient room, to allow section 1 to be swung again, into the position indicated by dotted lines in Fig. 1. The sample of grain held within the upper section of the sampler may be at this time emptied into a small sack for that purpose. After this is done the sampler may be completely withdrawn from the load of grain, and the balance of the sample of grain held within the lower section of the sampler may be emptied into the same sack, thus giving a complete sample of grain from the top to the bottom of the car.

When the improved sampler is to be used in sampling flax seed, any seed that may work in between the inner and outer tubes, as the tubes are rotated with respect to each other, will be carried into the grooves 17, and through the said grooves will be carried down to and through the bottom of the sampler. In case the flax seed should pack within the grooves 17, the spring 14 may be lifted, so as to clear the pins 16, and the tubes rotated with respect to each other so that the grooves 17 will come in succession in line with the ports 7. In this way any flax seed held within the grooves, will either fall out or may be scraped out, without having to separate the tubes. Preferably a cork or disk like plug 19 may be inserted in the lower end of section 9 to prevent the grain from running out when the upper section of the sampler is being swung into the position indicated by dotted lines in Fig. 1.

What I claim is;

1. A grain sampler, having inner and outer tubes formed with ports that are adapted to be moved into and out of registration by the rotation of one of said tubes with respect to the other, and which tubes are formed in sections, the sections of the outer tube being capable of separation and the sections of the inner tube having locking engagement one with the other, so that they may be rotated together, substantially as described.

2. A grain sampler, having inner and outer tubes formed with ports that are adapted to be moved into and out of registration by the rotation of one of said tubes with respect to the other, said tubes being formed in sections, a hinge joint connecting the section of the outer tube, and the sections of the inner tube having locking engagement one with the other so that they may be rotated together, substantially as described.

3. A grain sampler, having inner and outer tubes formed with ports, that are adapted to be moved into and out of registration by the rotation of one of said tubes with respect to the other, said tubes being formed in sections, a hinged joint connecting the sections of the outer tube means for locking said sections in an alined position, and the section of the inner tube having locking engagement one with the other, so that they may be rotated together, substantially as described.

4. A grain sampler, having inner and outer tubes formed with ports that are adapted to be moved into and out of registration by the rotation of one of said tubes with respect to the other, said tubes being formed in sections, a hinged joint connecting the sections of the outer tube, means of locking said section in an alined position, the sections of the inner tube having locking engagement one with the other, so that they may be rotated together, and means for preventing said inner and outer tubes from moving endwise with respect to each other, substantially as described.

5. A grain sampler, made up of outer and inner tubes, having ports adapted to be moved into and out of registration by the rotation of one of the tubes with respect to each other, and one of which tubes is provided with a longitudinal clearance groove adapted to catch and discharge flax seed, and other small particles, substantially as described.

6. A grain sampler, having an inner tube formed with ports and grooves, and an outer tube formed with ports that are adapted to be moved into and out of registration with the ports and grooves of its inner tube, by the rotation of the said tubes with respect to each other, substantially as described.

In testimony whereof I affix my signature in presence of two witnesses.

HUBERT M. GRAY.

Witnesses:
   H. D. KILGORE,
   F. D. MERCHANT.